United States Patent [19]

Miller

[11] 4,086,013

[45] Apr. 25, 1978

[54] COUPLING MECHANISM

[76] Inventor: Elgin J. Miller, 2212 Gates Ave., Redondo Beach, Calif. 90278

[21] Appl. No.: 503,609

[22] Filed: Sep. 6, 1974

[51] Int. Cl.² .................................................. F16B 7/00

[52] U.S. Cl. .................................... 403/292; 403/344; 59/85; 70/459

[58] Field of Search .................. 24/238, 239; 403/292, 403/344, 206, 410; 70/459, 18; 59/85

[56] References Cited

U.S. PATENT DOCUMENTS

| | | | |
|---|---|---|---|
| 838,611 | 12/1906 | Engeman | 24/239 |
| 839,047 | 12/1906 | Sylvester | 70/459 |
| 2,552,168 | 5/1951 | Goolsby | 403/292 |

FOREIGN PATENT DOCUMENTS

| | | | |
|---|---|---|---|
| 425,528 | 6/1926 | Germany | 70/18 |

*Primary Examiner*—Andrew V. Kundrat
*Attorney, Agent, or Firm*—Jack C. Munro

[57] ABSTRACT

A basic mechanism comprising a pair of members which when connected together form a solid unit. Centrally located and passing through the solid member on an axis is an aperture. Formed within each of the solid members is a circular shaped passageway or opening so that when the two members are connected together to form the solid unit, the openings of the two members cooperate to form the shape of a solid torus. The axis of the torus opening coincides with the axis of the aperture. A third member is located within the openings and is movable in respect thereto. With the members connected together to form the solid unit, the third member is movable between the connected together members thereby locking together the connected together members.

4 Claims, 15 Drawing Figures

COUPLING MECHANISM

BACKGROUND OF THE INVENTION

The field of the invention relates to mechanisms and more particularly to a mechanism which can be applied to a variety of fields, such as locking devices, duct connectors, univeral joints, clutches, plus numerous other fields of endeavor.

Basic mechanisms, such as a wheel, a ball, a combination of a belt and a roller, pivotally connected together linkages, rotating discs and other similar types of mechanisms have been known for a substantial period of time. The structure of this invention relates to a new and novel basic mechanism which is believed to not be previously known.

SUMMARY OF THE INVENTION

The structure of this invention is believed to be broadly described within the Abstract Of The Disclosure and reference is to be had thereto.

The structure of this invention can be applied within numerous fields of endeavor. Known examples of the type of structural units which can incorporate the basic mechanism of this invention are as follows: Locking devices, such as trailer hitches or combination locks; connectors, such as for example, a duct type of connector unit; universal joints wherein complete freedom of movement is provided eliminating undesirable moments in achieving this movement; fluid clutch mechanisms and using the fluid clutch mechanism to achieve a fluid differential.

It is envisioned that there are multiple uses of this basic mechanism, many of which are not known at this time.

DETAILED DESCRIPTION OF THE SHOWN EMBODIMENTS

Figure 1:
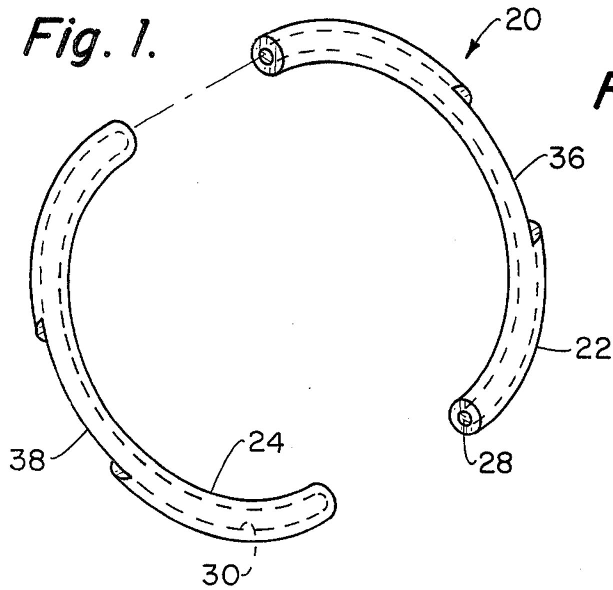
FIG. 1 is an isometric view of the basic mechanism of this invention showing the two outer members of the structure of this invention in a spaced apart manner.

Referring particularly to the drawings, there is shown in FIG. 1 the basic mechanism 20 of this invention which includes a first member 22 and a second member 24. The members 22 and 24 are shown to be substantially semi-circular and when connected together form a circular ring. In cross-section, each of the members 22 and 24 is circular so that when the members 22 and 24 are connected together they form, in essence, a solid torus. In cross-section, the configuration of the members 22 and 24 need not be circular and actually in some instances other cross-sectional configurations may be desired such as a polygonal configuration. However, it is important that when the members 22 and 24 are connected together a opening 26 is formed which, in essence, is the center hole of the "donut". However, in most instances, a solid torus configuration for the members 22 and 24 will, more than likely, be preferable.

Figure 2:
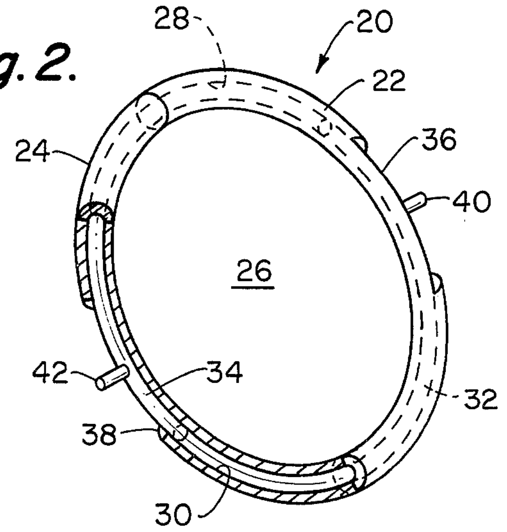
FIG. 2 is a view similar to FIG. 1 but showing the two members connected together.

It is to be noted that the members 22 and 24 shown in FIGS. 1 and 2 are substantially semi-circular. However, it is considered to be within the scope of this invention that one of the members 22 or 24 can be of a greater length than the other instead of the same length as shown in FIGS. 1 and 2. However, it is important that whatever lengths of the members 22 and 24 that is selected, that when the members 22 and 24 are connected together, that a continuous structure will be formed without any gaps therein. In other words, one member could only be 30° with the other member being 330° so that when connected together a continuous structure of 360° results.

Figure 5:
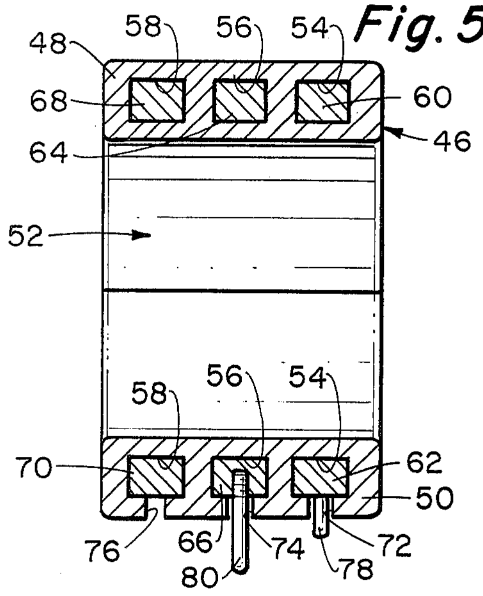
FIG. 5 is a cross-sectional view taken along line 5—5 of FIG. 4.

Located within the member 22 is a first chamber 28. Located within the second member 24 is a second chamber 30. The chambers 28 and 30 are of the same size in cross-section and the same length (because each of the members 22 and 24 shown in FIGS. 1 to 2 are of the same length). When the members 22 and 24 are connected together, the chambers 28 and 30 are aligned so that the resulting continuous chamber formed by chambers 28 and 30 is in substantially the shape of a solid torus. Although it is normally preferable that the chambers 28 and 30 be of a circular cross-section, it is not necessary and may assume a polygonal shaped configuration, such as shown in FIG. 5 of the drawings which will be further described further on in the specification.

Located within the chamber 28 and establishing a close fit therewith is a third member 32. A similar third member 34 is similarly located within the second member 24. The members 32 and 34 are movable within their respective chambers 28 and 30 and also are movable within the other chamber. The members 32 and 34 may be of any given length except no greater than the length of its particular member 22 and 24. Normally, the members 32 and 34 will be of the same length as its members 22 and 24, but may be of a lesser length. It is also considered to be within the scope of this invention that one of the members 32 or 34 could be eliminated with there only being a single member.

Formed within the member 22 is a first longitudinal slot 36. Similarly formed within the member 24 is a second longitudinal slot 38. A pin 40 is fixedly secured to the member 32. Similarly, a pin 42 is fixedly secured to the member 34. The pins 40 and 42 are to facilitate manual movement of the respective members 32 and 34 within the continuous chamber formed by connected together chambers 28 and 30.

The operation of the basic mechanis shown in FIGS. 1 and 2 of this invention is as follows: When the members 32 and 34 are located solely within the confines of their respective members 22 and 24, the members 22 and 24 can be separated from one another as shown in FIG. 1. When the members 22 and 24 are connected together as shown in FIG. 2, activation of the pins 40 and 42 are to effect movement of the members 32 and 34 so these members are moved partially within the confines of the other of the chambers 32 and 34. As a result, a continuous, solid integral tightly connected unit is formed which is, in essence, as shown in FIG. 2, a solid ring. The interconnection is quite tight and would, in essence, result in a single, integral ring.

When it is desired to separate the members 22 and 24, it is only necessary to move the members 32 and 34, by means of pins 40 and 42, so that the members 32 and 34 are solely located within its respective member 22 and 24. Therefore, separation of the members 22 and 24 is then permitted.

This basic mechanism 20 can now be employed in numerous embodiments of structure. One simple way in which this mechanism can be employed is in a ring type of lock. This ring type of lock could be readily employed as a trailer hitch for vehicles, a door lock, a bicycle lock, a padlock or any other type of conventional locking mechanism. It is to be understood that member 22 is to be attached to one element of structure (not shown) with the member 24 to be attached to another element of structure (not shown). If it is desired to lock together these two elements of structure, the members 22 and 24 are located adjacent one another as shown in FIG. 2 and the members 32 and 34 moved accordingly within the continuous chamber provided by connected together chambers 28 and 30 resulting in a locking of the unit as previous mentioned.

Figure 3:
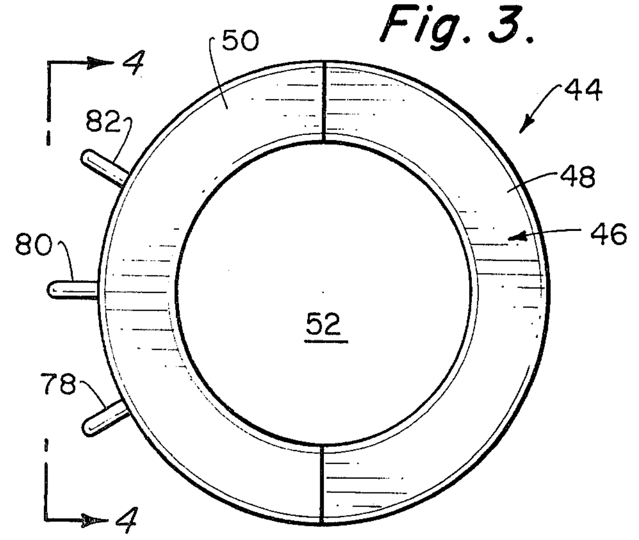
FIG. 3 is a side view of a combination lock structure incorporating a plurality of the basic mechanisms of this invention arranged in a side by side manner.
Figure 4:
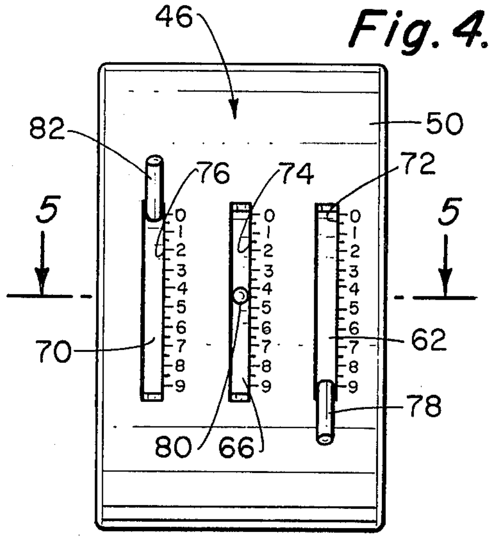
FIG. 4 is a front view of the combination lock structure embodying the basic mechanism of this invention taken along line 4—4 of FIG. 3.

The following description will discuss the use of the basic mechanism 20 of this invention in different environments. Referring in particular to FIGS. 3 to 5, a combination lock structure 44 is shown. The combination lock 44 includes a housing 46 which is formed of two identical length members 48 and 50. The members 48 and 50 are basically identical in configuration and when connected together an opening 52 is provided through the housing 46. Within the opening 52 may be located a pair of elements of an outside structure which is desired to be locked together. As for example, a fixed post and a portion of the frame of a bicycle in order to lock the bicycle to a fixed structure and prevent its unauthorized removal. Also, the member 50 could be attached to the bicycle with the member 48 being attached to the post and they can be connected together in that manner. The combination lock 44 could be employed in numerous other areas other than as a bicycle lock.

When the members 48 and 50 are connected together as shown in FIGS. 3, 4 and 5, there are three continuous chambers 54, 56 and 58 located in a spaced apart manner passing through the housing 46. The chambers 54, 56 and 58 are substantially identical in configuration and are each ring shaped and have a cross-section substantially of a rectangular shape. The cross-sectional configuration of the chambers 54, 56 and 58 could be any conventional configuration, circular or other polygonal shape. It is also considered to be within the scope of the combination lock 44 that only a single such chamber 54 be employed or more than three in number of such chambers 54 could be employed.

Within the continuous chamber 54 is located a pair of third members 60 and 62. Also located within the continuous chamber 56 are a pair of third members 64 and 66 and similarly a pair of third members 68 and 70 are located within the continuous chamber 58. The third members 60 to 70 establish a close fit with its respective chamber 54, 56 or 58 but are movable within respect thereto. Normally, the length of the members 60 to 70 will be equal in length to the members 48 and 50.

Formed within the member 50 are a plurality of longitudinal slots 72, 74 and 76. Connected to the member 62 is a pin 78 which extends through slot 72. In a similar manner, pin 80 is secured to member 66 and extends through slot 74. In a similar manner a pin 82 is secured to member 70 and extends through slot 76.

Imprinted upon the member 50 adjacent each of the slots 72, 74 and 76 is a series of indicia represented by numerals zero to nine. The location of the pins 78, 80 and 82 with its respective third member 62, 66 and 70 determines at what position the members 48 and 50 can be separated. In order to separate members 48 and 50 all of the third members 60 to 70 would have to be aligned properly so that the ends of all these members align with the ends of the members 48 and 50. It is to be understood that, for example, as third member 62 is moved within its continuous chamber, the force will result in movement of member 60 although member 60 itself is not attached to a pin. This occurs in a similar manner with members 66 and 64 and members 70 and 68.

Because the pins 78, 80 and 82 are located at different positions in respect to the length of its respective members 62, 66 and 70, a combination type of lock is obtained. For example, referring particularly to FIG. 4, if the shown combination would result in separation of the members 48 and 50, that combination would be nine, four, zero. Of course, it is to be understood that any particular combination may be selected, if desired.

Figure 6:
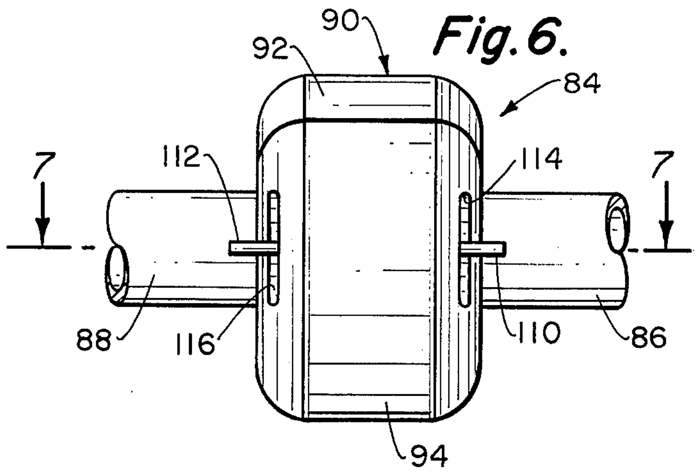
FIG. 6 is an elevational view of a duct connector structure which employs the basic mechanism of this invention.
Figure 7:
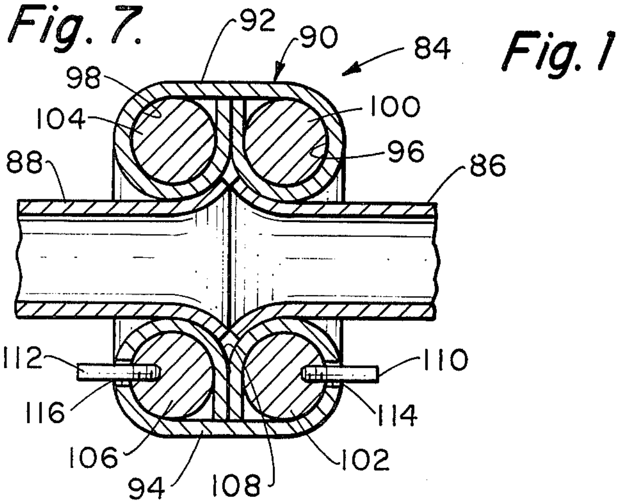
FIG. 7 is a cross-sectional view taken along line 7—7 of FIG. 6.

Referring particularly to FIGS. 6 and 7 of the drawings, a second embodiment of structure incorporating the basic mechanism 20 of this invention is shown. The second embodiment of structure comprises a duct connector 84. The connector 84 is to function to interconnect together in an aligned manner duct sections 86 and 88. In order to accomplish this, a housing 90 is employed which is made of two members 92 and 94 which when connected together form a continuous ring-shaped unit. The members 92 and 94 will normally be of the same length. When the members 92 and 94 are connected together two in number of continuous chambers 96 and 98 are formed. Within the chamber 96 are located two third members 100 and 102. Similarly, within the chamber 98 are located two third members 104 and 106. The third members 100 to 106 are formed substantially circular in cross-section and are to be of a length equal to its respective member 92 or 94. The housing 90 is constructed in such a manner that interiorly thereof an annular crevice 108 is formed when the members 92 and 94 are connected together.

Attached to the member 102 is a pin 110. Similarly attached to the member 106 is a pin 112. A curved longitudinal slot 114 is formed on one side of the member 94 with a similar curved longitudinal slot 116 formed on the other side of the member 94. The pin 110 extends through slot 114 with pin 112 extending through slot 116.

In order to operate the connector of FIGS. 6 and 7 employing the basic mechanism of this invention, the duct sections 86 and 88 are located in the aligned adjacent end to end position. Adjacent ends of the duct sections 86 and 88 are in substantially abutting contact with the ends being slightly flared in an outward direction. The members 92 and 94 are then placed together so that the flared ends of the duct sections 86 and 88 lie within the arcuate crevice 108. The third members 106 and 102 are then moved by their respective pins 112 and 110 which result in these members moving from member 94 into member 92. Also, the third members 100 and 104 located within the member 92 are caused to be moved into the member 94. As a result, a locked unit is formed connecting together in a secure manner the duct sections 86 and 88.

Although the basic mechanism of this invention has been described through use of a pin and a slot arrangement such as pin 110 and slot 114, it is considered to be within the scope of this invention that other types of means may be employed to effect movement of the third members. For example, it is possible that the third members could be constructed of a magnetizeable material wherein the housings, such as housings 92 and 94 are constructed of a non-magnetizable material. Movement of the third members could then be accomplished by the use of an exterior magnet source. Also, other mechanical type of movement means may be employed rather than a pin and a slot.

Figure 8:
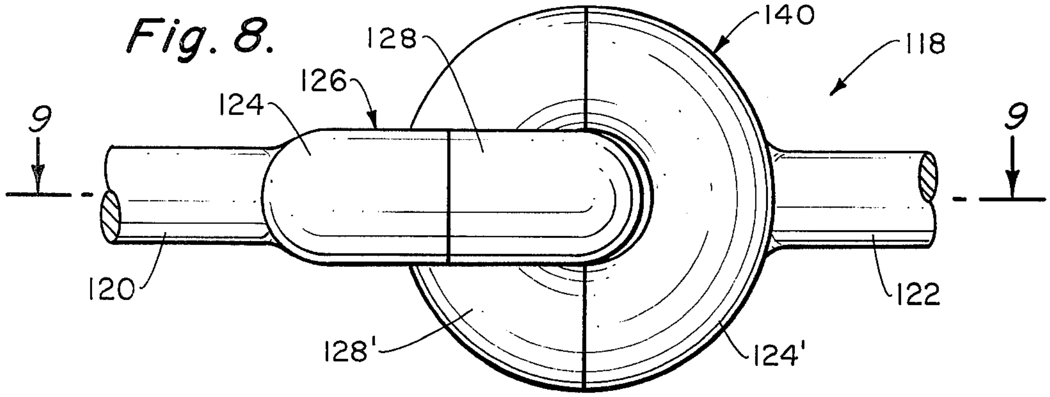
FIG. 8 is an elevational view through a universal joint embodying the basic mechanism of this invention.
Figure 9:
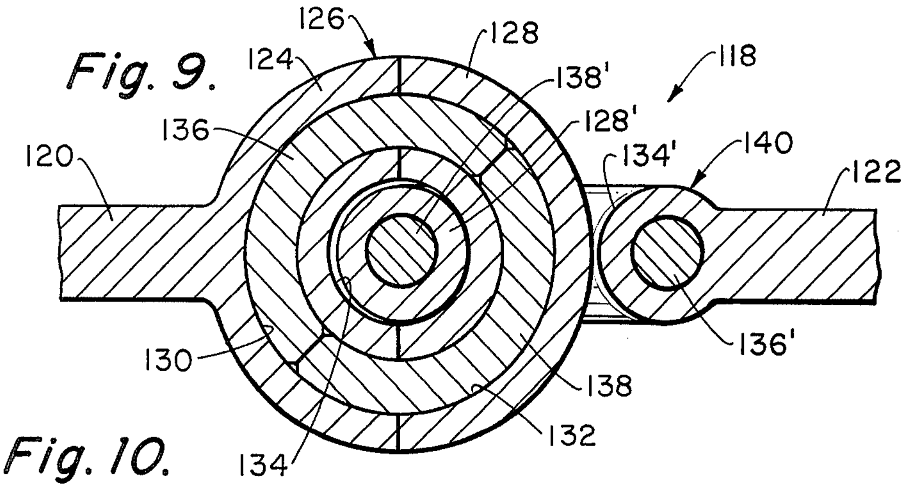
FIG. 9 is a cross-sectional view taken along line 9—9 of FIG. 8.

Referring particularly to FIGS. 8 and 9 of the drawings, there is shown a universal joint structure embodying the concept of the basic mechanism of this invention. Such universal joints are frequently employed connecting one longitudinal shaft to another longitudinal shaft and permitting a certain amount of three-dimensional movement of one shaft with respect to another shaft. The purpose for this is to eliminate breakage of the shafts. Such universal joints are frequently employed in vehicles between the drive shaft and the input shaft to a differential.

Referring in particular to FIGS. 8 and 9, the structure 118 is to include a first rotatable shaft 120 and a second rotatable shaft 122. The first shaft 120 is integrally connected to a first member 124 of a first basic mechanism 126. The member 124 is to be connectable to a second member 128. Members 124 and 128 when connected together are in the basic shape of a solid torus. The member 124 includes an interior semi-circular opening 130 with the member 128 including an internal semi-circular opening 132. The openings 130 and 132 cooperate together to form a continuous solid torus shaped opening when the members 124 and 128 are connected together as shown in FIGS. 8 and 9. When these members are connected together, there is an aperture 134 formed therethrough.

Located within the opening 130 is a third member 136 and located within the opening 132 is a third member 138. Some means is provided to cause movement of the third members 136 and 138 within the continuous chamber resulting in the connection of the openings 130 and 132. This means may comprise a pin and slot arrangement as previously mentioned, or also can comprise a magnet arrangement as previously mentioned, or can take the form of other means, if desired. It is believed to not be necessary to show this means within FIGS. 8 and 9.

Also employed within the universal joint structure 118 is a second basic mechanism 140. The structure and arrangement of parts of the second basic mechanism 140 is identical to the basic mechanism 126 and like numerals have been employed to refer to like parts. The member 128' is conducted through aperture 134 with member 128 being conducted through aperture 134'.

By using the structure of FIGS. 8 and 9, a rotatable connection is established between the first shaft 120 and the second shaft 122. Also, three degress of movement is provided of shaft 120 with respect to shaft 122. By using the structure of FIGS. 8 and 9, undesirable torque moments which are usually employed in other universal type of joints are not produced within the structure of FIGS. 8 and 9 of this invention.

The basic mechanism of this invention can be employed to produce a clutch mechanism 142 which will be described in relation to FIGS. 10 to 13. The clutch mechanism 142 is connected to a first shaft 144, which will be called the input shaft, and an output shaft 146. The input shaft 144 is connected to an annular housing 148 which includes therein an annular chamber 150. The annular housing 148 is separated into a first member 152 and a second member 154. The members 152 and 154 cooperate together to formed an enclosed unit. The chamber 150 is of an elliptical configuration and also is twisted throughout the entire length of the chamber 150. The amount of twist can be varied but is expected to be a complete 360° throughout the entire length of chamber 150. Also, the direction of twist will be clockwise.

The output shaft 146 is connected to a driving plate 156. The plate 156 is basically in the shape of a disc. The plate 156 extends through an appropriate annular opening formed within the housing 148. It is to be understood that there will be appropriate bearing connections provided between the plate 156 and the housing 148 and these bearing connections are not shown.

Integrally secured to the periphery of the disc 156 is a third member 158. The third member 158 is formed elliptical in cross-section and is in the basic shape of a ring. The third member 158 is also twisted 360° along the entire length of the third member 158 and this twisting is in the opposite direction to the twisting of the annular chamber 150, that is, counterclockwise. The major axis of the ellipse of the elliptical configuration of the third member 158 is equal to the minor axis of the elliptical chamber 150. Therefore, at two points, diametrically located apart, the major axis of the member 158 will coincide with the minor axis of the chamber 150. This is a position depicted in FIG. 13.

Figure 11:
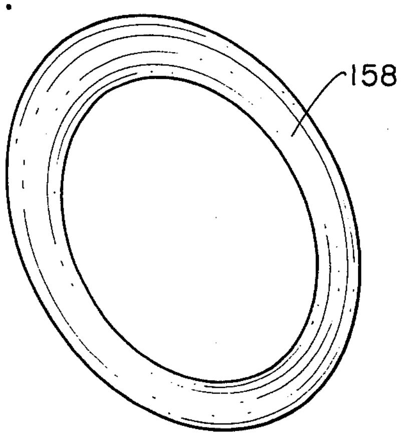
FIG. 11 is an isometric view of the solid torus member of FIG. 10 showing such formed into the shape of a solid torus.
Figure 10:
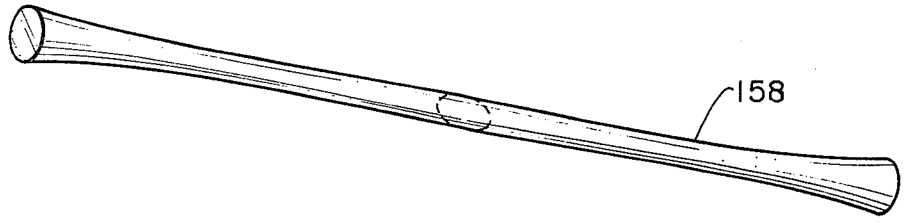
FIG. 10 is an elevational view of the member inserted within the continuous opening formed within the connected together members showing this member prior to being formed into the shape of a solid torus.
Figure 12:
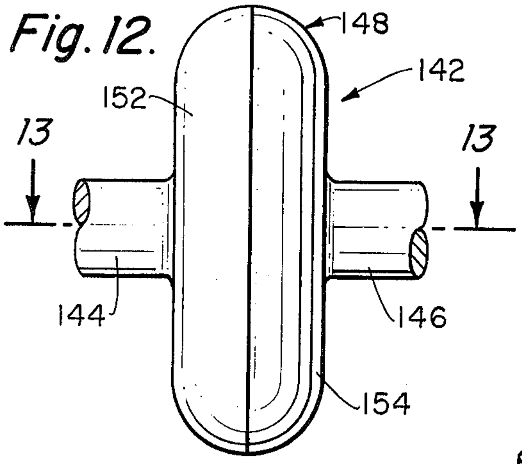
FIG. 12 is an elevational view of a clutch unit embodying the toroidal member of FIG. 11.

In order to form the third member 158, reference is to be had in particular to FIGS. 10 and 11. The member 158 is first formed from an elongated rod as shown in FIG. 10. The particular elliptical configuration is formed and then the elongated rod is twisted so that one end of the rod is 360° displaced from the other end. The rod 158 is then formed into the ring shown in FIG. 11. The ring 158 is then secured in some manner to the plate 156.

An oil or other type of viscous liquid is to be interposed within the annular chamber 150, within the space not occupied by the third member 158. When this chamber is full, as the shaft 144 rotates and the housing 148, the oil within the chamber 150 causes the third member 158 to rotate in a one to one ratio. This rotation is produced due to the opposite twisting of the third member 158 with respect to the chamber 150. If the twist was in the same direction, the housing 148 would merely rotate and no movement of the member 158 would occur. But due to the opposite twisting, there is a difference in the amount of space provided from one side of the third member 158 to the other side of the third member 158 located within the chamber 150. This difference in space during rotation of the housing 148 tends to cause the oil, or other liquid, to be conducted from one side of the member 158 to the other side of the member 158. However, such conductance of liquid therebetween is prevented due to the snug interfitting relationship established by the member 158 with respect to the wall of the chamber 150. Therefore, the third member 158 rotates along with the housing 148 which thereupon results in rotation of the output shaft 146. It is to be understood that this situation will only occur when the chamber 150 is entirely filled with liquid.

If the chamber 150 is not entirely filled with liquid, there will be a certain amount of slippage. Therefore, by varying the amount of liquid within the chamber 150, a clutch mechanism can be achieved. In other words, for every revolution of the shaft 144, shaft 146 may only revolve one-half turn or three-fourths of a turn, or even only a quarter of a turn. Therefore, by incorporating the basic mechanism of this invention, a clutch can be obtained.

Figure 13:
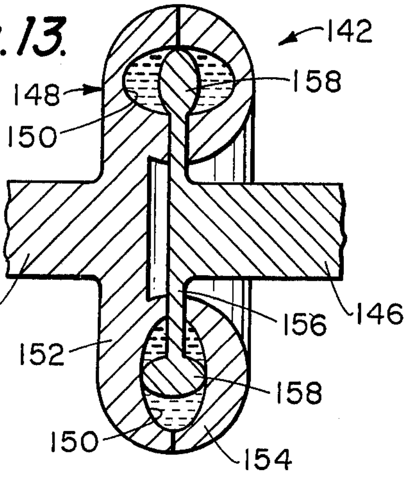
FIG. 13 is a cross-sectional view taken along line 13—13 of FIG. 12.
Figure 14:
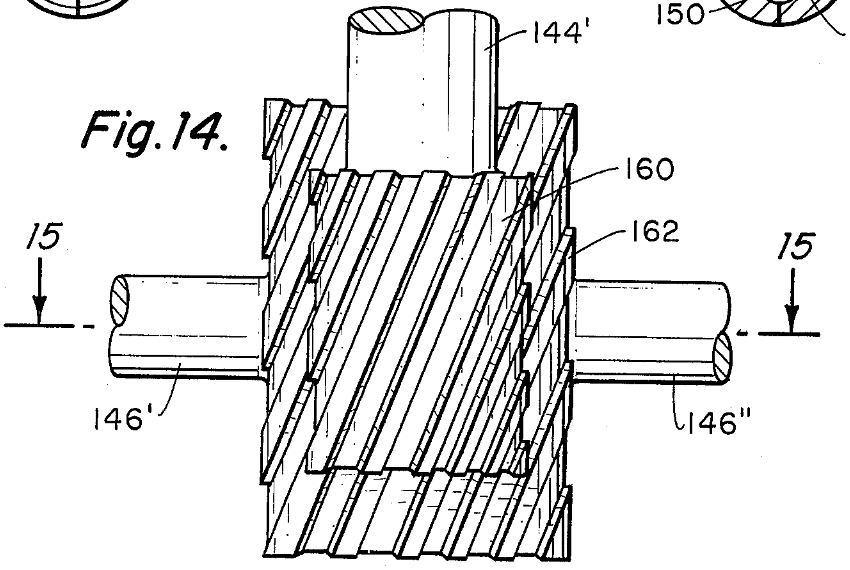
FIG. 14 is a top view of the clutch structure of FIG. 13 embodied into a differential unit.
Figure 15:
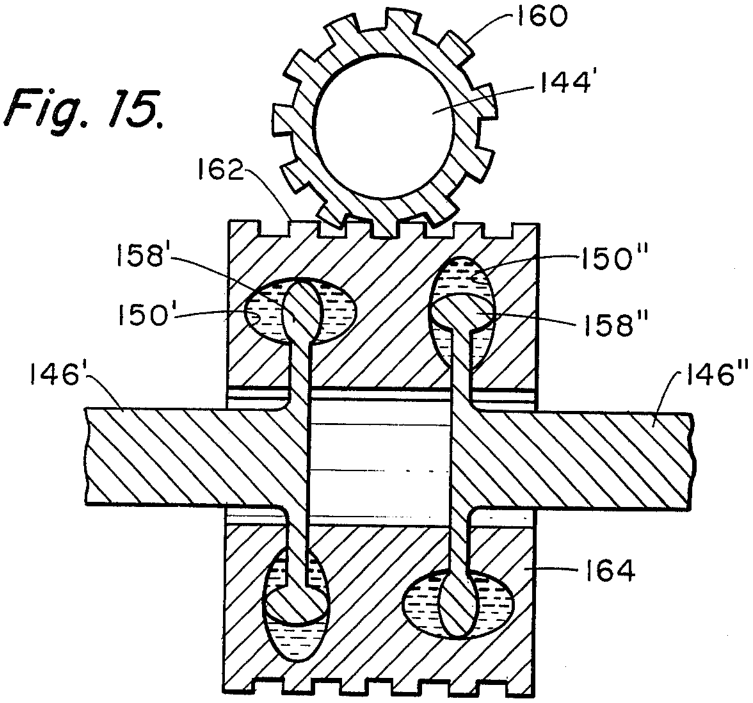
FIG. 15 is a cross-sectional view of the differential structure of FIG. 14 taken along line 15—15 of FIG. 14.

Referring particularly to FIGS. 14 and 15, the clutch mechanism shown in FIG. 13 can be employed to achieve a differential. The input gear 144' is connected to a drive gear 160. The drive gear 160 causes rotation of a driven gear 162. The driven gear 162 is formed upon the housing 164. Within the housing 164 in a spaced side by side manner are two in number of the clutch mechanisms shown in FIG. 13. Like numerals have been employed to refer to like parts and for the operation of each of the clutch mechanisms within the housing 164, reference is to be had to the foregoing description directed to the clutch mechanism.

The first clutch mechanism mounted within housing 164 operates an output shaft 164'. The second clutch mechanism operates an output shaft 146''. The longitudinal axes of the shafts 146' and 146'' are in alignment with one another with the shafts extending opposite to each other in respect to the housing 164. Each of the clutch mechanisms within the housing 164 operate independently and the oil, or other liquid, which is located within the chambers 150' and 150'' can be maintained at a constant level or can be varied by appropriate valving arrangement (not shown).

The operation of the differential of FIGS. 14 and 15 is that as the power is transmitted from the input shaft 144' through the gears 160 and 162 to the housing 164, the oil causes the third members 158' and 158'' to be rotated. This rotation may be equal to the rotation of the housing 164 or may be rotated at some velocity less than the velocity of rotation of the housing 164. As a result, the output shafts 146' and 146'' are rotated.

What is claimed is:

1. A basic mechanism comprising:

a first member having a first internal chamber of constant cross-sectional area, said first internal chamber being arcuate along its length;

a second member having a second internal chamber of constant cross-sectional area, said second internal chamber being arcuate along its length, said first member and said second member connectable together with their ends in abutting contact with said first and said second chambers forming a continuous chamber, said first chamber being substantially the same size in cross-section as said second chamber with said first and said second members connected together there being an aperture entirely through the basic mechanism connecting with the ambient at each end;

a third member contained within said first chamber establishing a close fit with the interior of said first chamber, said third member movable within said second chamber to occupy both a portion of said second chamber and a portion of said first chamber, said third member being no greater in length than the length of said first chamber;

means for moving said third member within said continuous tubular chamber, said means permitting selecting of a first position of said third member solely within the confines of said first chamber or a second position occupying a portion of both said first chamber and said second chamber;

a fourth member contained within said second chamber, said fourth member movable within said first chamber to occupy both a portion of said first chamber and a portion of said second chamber, said fourth member being no greater in length than the length of said second chamber, said fourth member establishing a substantially close fit with said first and second chambers;

said third member being equal in length to said fourth member; and the length of said third member being substantially equal to the length of said first chamber, the length of said fourth member being substantially equal to the length of said second chamber.

2. A basic mechanism comprising:

a first member having a first internal chamber of constant cross-sectional area, said first internal chamber being arcuate along its length;

a second member having a second internal chamber of constant cross-sectional area, said second internal chamber being arcuate along its length, said first member and said second member connectable together with their ends in abutting contact with said first and said second chambers forming a continuous chamber, said first chamber being substantially the same size in cross-section as said second chamber with said first and said second members connected together there being an aperture entirely through the basic mechanism connecting with the ambient at each end;

a third member contained within said first chamber establishing a close fit with the interior of said first chamber, said third member movable within said second chamber to occupy both a portion of said second chamber and a portion of said first chamber, said third member being substantially equal to the length of said first chamber;

means for moving said third member within said continuous tubular chamber, said means permitting selecting of a first position of said third member solely within the confines of said first chamber or a second position occupying a portion of both said first chamber and said second chamber; and a fourth member contained within said second chamber, said fourth member movable within said first chamber to occupy both a portion of said first chamber and a portion of said second chamber, said fourth member being substantially equal to the length of said second chamber, said fourth member establishing a substantially close fit with said first and second chambers.

3. The basic mechanism as defined in claim 2 wherein: said first and said second members being circular in cross-section whereby the overall shape of said continuous chamber being a solid taurus.

4. The basic mechanism as defined in claim 2 wherein: said third member being equal in length to said fourth member.

* * * * *